United States Patent
Lee (10) Patent No.: US 10,824,273 B2
(45) Date of Patent: Nov. 3, 2020

(54) METHOD FOR CORRECTING MEASUREMENT THRESHOLD OF CAPACITIVE SENSING APPARATUS AND CAPACITIVE SENSING APPARATUS

(71) Applicant: Shang-Li Lee, Keelung (TW)

(72) Inventor: Shang-Li Lee, Keelung (TW)

( * ) Notice: Subject to any disclaimer, the term of this patent is extended or adjusted under 35 U.S.C. 154(b) by 0 days.

(21) Appl. No.: 16/264,821

(22) Filed: Feb. 1, 2019

(65) Prior Publication Data

US 2019/0250765 A1    Aug. 15, 2019

(30) Foreign Application Priority Data

Feb. 14, 2018    (TW) .............................. 107105574 A (51) Int. Cl.
  *G06F 3/041*    (2006.01)
  *G06F 3/044*    (2006.01)
(52) U.S. Cl.
  CPC ............ *G06F 3/0418* (2013.01); *G06F 3/044* (2013.01)

(58) Field of Classification Search
  CPC .............................. G06F 3/0418; G06F 3/044
  See application file for complete search history.

(56) References Cited

U.S. PATENT DOCUMENTS

| 2014/0278173 A1* | 9/2014 | Elia ...................... G06F 3/0418 702/65 |
| 2017/0153767 A1* | 6/2017 | Citta ..................... G06F 3/0418 |
| 2019/0079613 A1* | 3/2019 | Zhang ................. G02F 1/13338 |

\* cited by examiner

*Primary Examiner* — Ryan A Lubit
(74) *Attorney, Agent, or Firm* — Hauptman Ham, LLP (57) ABSTRACT

A method for correcting a measurement threshold of a capacitive sensing apparatus and a capacitive sensing apparatus are provided, so that a measurement threshold used when the capacitive sensing apparatus performs touch detection can be set by using a plurality of statistics of various signals at all sensing points on a same electrode, thereby avoiding problems such as non-uniform strength and insufficient strength of a signal at each sensing point on a signal sensor caused by a measurement time difference.

10 Claims, 9 Drawing Sheets

METHOD FOR CORRECTING
MEASUREMENT THRESHOLD OF
CAPACITIVE SENSING APPARATUS AND
CAPACITIVE SENSING APPARATUS

CROSS-REFERENCE TO RELATED APPLICATION

This non-provisional application claims priority under 35 U.S.C. § 119(a) to Patent Application No. 107105574 in Taiwan, R.O.C. on Feb. 14, 2018, the entire contents of which are hereby incorporated by reference.

BACKGROUND

Technical Field

The present invention relates to capacitive sensing technologies, and in particular, to a method for correcting a measurement threshold of a capacitive sensing apparatus and a capacitive sensing apparatus.

Related Art

To improve the convenience of use, an increasing number of electronic apparatuses use touch screens as operation interfaces. In this way, users can directly perform operations by tapping and selecting images on the touch screens, thereby providing more convenient and humanized operation modes. A touch screen mainly consists of a display providing a display function and a sensing apparatus providing a touch function.

Usually, the sensing apparatus learns, by using a self-capacitance sensing technology and/or a mutual capacitance sensing technology, whether a panel is touched by a user. In a sensing process, when the sensing apparatus detects a change in a capacitance value at a coordinate position, the sensing apparatus determines that the coordinate position is touched by the user. Therefore, during operation, the sensing apparatus stores a capacitance value indicating no touch for each coordinate position, and when a latest capacitance value is received subsequently, determines, by comparing the latest capacitance value with the capacitance value indicating no touch, whether a position corresponding to the capacitance value has been touched.

A difference in a design, manufacturing, and a material of the sensing apparatus leads to a difference in a parasitic capacitance at each sensing point (an intersection point of a driving electrode line and a sensing electrode line) on the sensing apparatus. Therefore, signal strength of sensing points is different. The sensing apparatus need obtain a signal having strong and uniform strength by sensing via each sensing point, thereby conveniently performing subsequent signal processing (for example, touch detection). Because different sensing points cannot complete measurement at the same time, there is a problem caused by a measurement time difference. For example, signal bases of different sensing points are stable at a same time, but vary over time. Because different sensing points have different measurement time points, a change in a signal base caused by a measurement time difference is prone to be considered as instability of signal bases of different sensing points.

SUMMARY

In an embodiment, a method for correcting a measurement threshold of a capacitive sensing apparatus includes the following steps: scanning a signal sensor, to obtain base signals at a plurality of sensing points on the signal sensor, where the signal sensor includes a plurality of first electrode lines and a plurality of second electrode lines, and the first electrode lines and the second electrode lines are arranged in a staggered manner to define the sensing points; simulating a normal touch event by using a signal simulation unit, to generate a first touch simulation signal; generating a first touch signal at each sensing point based on the first touch simulation signal and a base signal at each sensing point; calculating a plurality of first statistics of the base signals at the sensing points defined by each first electrode line, where the first statistics includes an average value of the base signals, a standard deviation of the base signals, a maximum value of the base signals, and a minimum value of the base signals; calculating a plurality of second statistics of the first touch signals at the sensing points defined by each first electrode line, where the second statistics includes an average value of the first touch signals, a standard deviation of the first touch signals, a maximum value of the first touch signals, and a minimum value of the first touch signals; and setting a plurality of measurement thresholds according to the first statistics and the second statistics, where the measurement thresholds includes a first allowable range of a sensing signal for which no touch event occurs, a second allowable range of a sensing signal for which the normal touch event occurs, and a measurement reference point.

In an embodiment, a capacitive sensing apparatus includes a plurality of first electrode lines, a plurality of second electrode lines, and a signal processing circuit. The first electrode lines and the second electrode lines are staggered with each other, and the first electrode lines and the second electrode lines define a plurality of sensing points configured in a matrix. The signal processing circuit is electrically connected to the first electrode lines and the second electrode lines. The signal processing circuit performs a correction process and performs touch detection on each sensing point based on a result of the correction process. The correction process includes the following steps: scanning the sensing points, to obtain base signals of the sensing points; simulating a normal touch event to generate a first touch simulation signal; generating a first touch signal at each sensing point based on the first touch simulation signal and a base signal at each sensing point; calculating a plurality of first statistics of the base signals at the sensing points defined by each first electrode line, where the first statistics includes an average value of the base signals, a standard deviation of the base signals, a maximum value of the base signals, and a minimum value of the base signals; calculating a plurality of second statistics of the first touch signals at the sensing points defined by each first electrode line, where the second statistics includes an average value of the first touch signals, a standard deviation of the first touch signals, a maximum value of the first touch signals, and a minimum value of the first touch signals; and setting a plurality of measurement thresholds according to the first statistics and the second statistics, where he measurement thresholds includes a first allowable range of a sensing signal for which no touch event occurs, a second allowable range of a sensing signal for which the normal touch event occurs, and a measurement reference point.

In conclusion, according to the method for correcting a measurement threshold of a capacitive sensing apparatus and the capacitive sensing apparatus in the present invention, a measurement threshold used when the capacitive sensing apparatus performs touch detection can be set by using a plurality of statistics of various signals at all sensing points on a same electrode, thereby avoiding problems such as non-uniform strength and insufficient strength of a signal at each sensing point caused by a measurement time difference.

BRIEF DESCRIPTION OF THE DRAWINGS

The present invention will become more fully understood from the detailed description given herein below for illustration only, and thus are not limitative of the present invention, and wherein.

DETAILED DESCRIPTION

First, a method for correcting a measurement threshold of a capacitive sensing apparatus according to any embodiment of the present invention can be applicable to a capacitive sensing apparatus, for example, but not limited to, a touch panel, an electronic drawing board, or a handwriting board. In some embodiments, the capacitive sensing apparatus and a display may further be integrated into a touch screen. In addition, a touch on the capacitive sensing apparatus may be performed by using a hand or a touch element such as a stylus or a touch brush.

Figure 1:
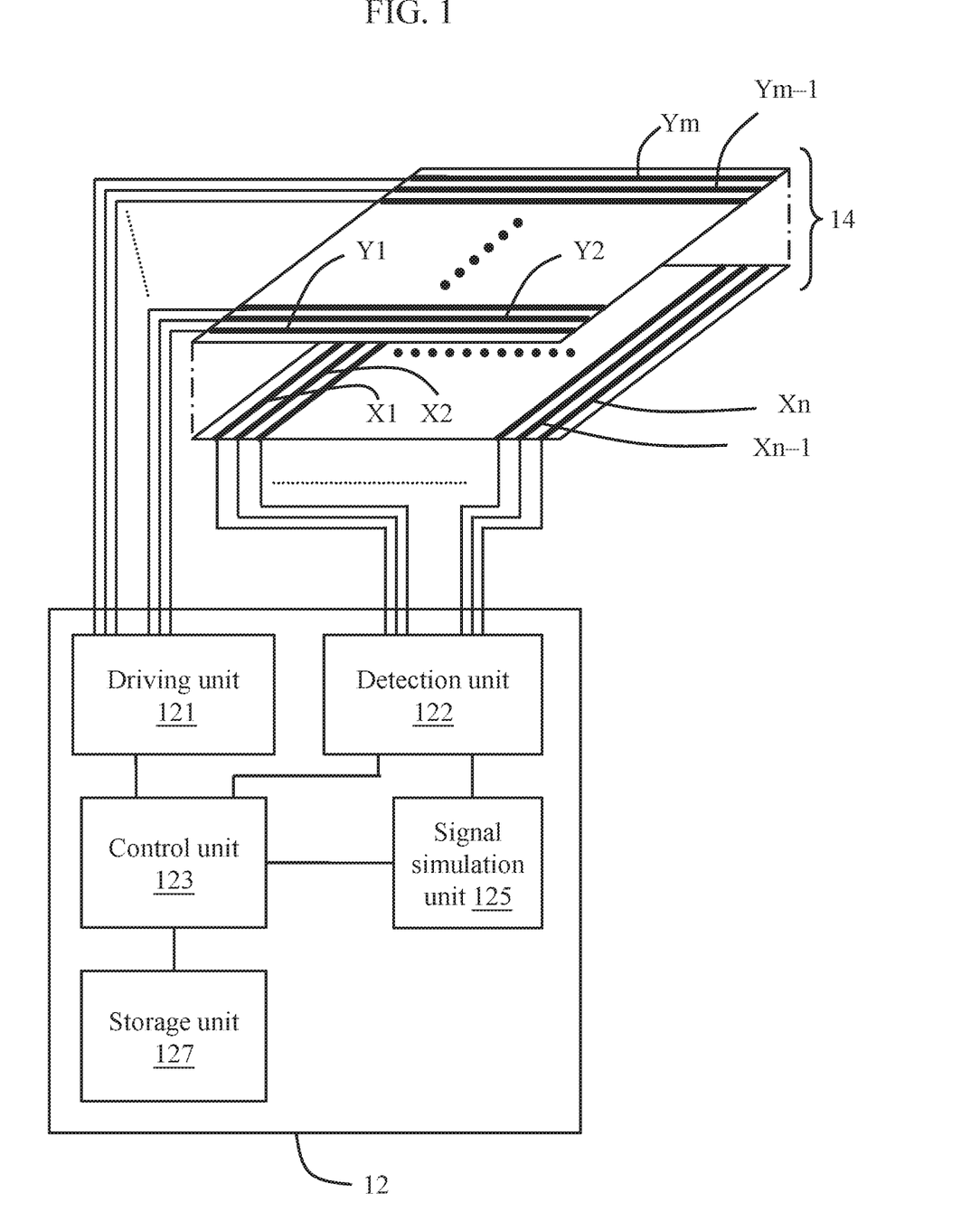
FIG. 1 is a schematic block diagram of a capacitive sensing apparatus according to an embodiment of the present invention.
Figure 2:
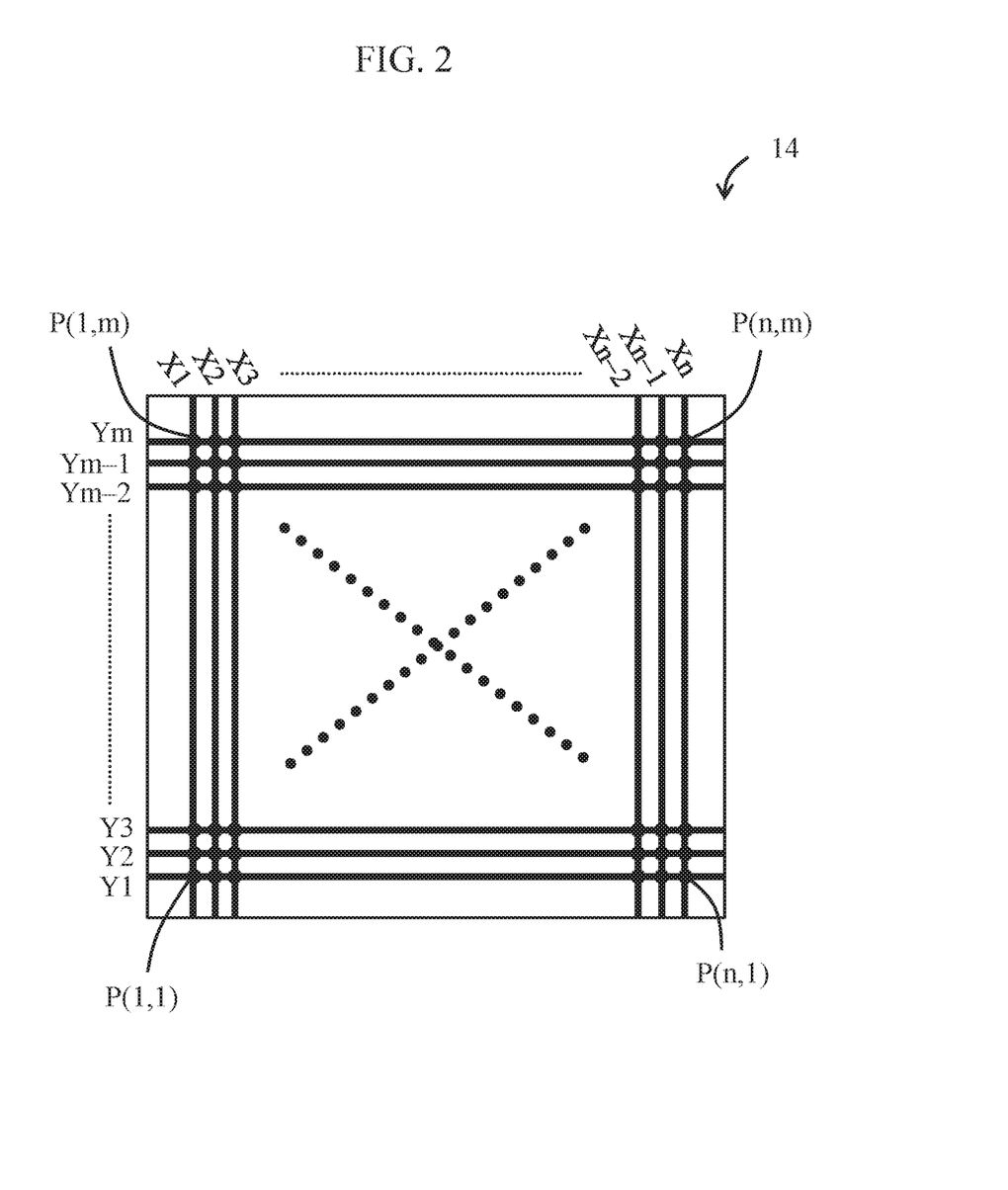
FIG. 2 is a schematic diagram of an embodiment of a signal sensor in FIG. 1.

FIG. 1 is a schematic block diagram of a capacitive sensing apparatus according to an embodiment of the present invention. Referring to FIG. 1, the capacitive sensing apparatus includes a signal processing circuit 12 and a signal sensor 14. The signal sensor 14 is connected to the signal processing circuit 12. The signal sensor 14 includes a plurality of electrodes lines (for example, first electrode lines Y1 to Ym and second electrode lines X1 to Xn). The first electrode lines Y1 to Ym cross the second electrode lines X1 to Xn, where n and m are positive integers, and n may be equal to m or may be not equal to m. From a top view, the first electrode lines Y1 to Ym and the second electrode lines X1 to Xn are staggered with each other, and define a plurality of sensing points P(1,1) to P(n,m) configured in a matrix, as shown in FIG. 2. In some embodiments, from the top view, the overlapped first electrode lines Y1 to Ym and second electrode lines X1 to Xn have a honeycomb shape, a grid-like shape, or a grating shape. In some embodiments, the first electrode lines Y1 to Ym and the second electrode lines X1 to Xn may be located on different planes (located on different sensing layers), and an insulation layer (not shown) may be, but not limited to be, clamped between the different planes. In some other embodiments, the first electrode lines Y1 to Ym and the second electrode lines X1 to Xn may also be located on a same plane, that is, located on a single sensing layer.

In an embodiment, the first electrode lines Y1 to Ym may be sensing electrode lines, and the second electrode lines X1 to Xn may be driving electrode lines. However, the present invention is not limited thereto. In another embodiment, the first electrode lines Y1 to Ym may be driving electrode lines, and the second electrode lines X1 to Xn may be sensing electrode lines.

The signal processing circuit 12 includes a driving/detection unit and a control unit 123. The control unit 123 is coupled to the driving/detection unit. The driving/detection unit includes a driving unit 121 and a detection unit 122. Herein, the driving unit 121 and the detection unit 122 may be integrated into a single element, or may be implemented by using two elements. This is determined according to an actual situation in an end view design.

The driving unit 121 is configured to output a driving signal (for example, a driving voltage) to a driving electrode line. The detection unit 122 is configured to measure a sensing electrode line based on a measurement threshold. Herein, the control unit 123 may be configured to: control operation of the driving unit 121 and the detection unit 122, and determine a change in a capacitance value at each sensing point according to a background signal (a capacitance value for which that there is no touch has been determined) and a sensing signal (a capacitance value for which whether a touch occurs is to be detected). The background signal may be obtained by using a previously measured base signal.

Herein, the capacitive sensing apparatus can set, by performing the method for correcting a measurement threshold of a capacitive sensing apparatus according to any embodiment of the present invention, a measurement threshold used when the capacitive sensing apparatus performs touch detection, thereby avoiding problems such as non-uniform strength and insufficient strength of a signal at each sensing point caused by a measurement time difference. In other words, the signal processing circuit 12 performs a correction process and performs touch detection (a normal process) on each sensing point based on a result of the correction process.

Herein, still referring to FIG. 1, the signal processing circuit 12 may further include a signal simulation unit 125. The signal simulation unit 125 is electrically connected to the detection unit 122 and the control unit 123. The control unit 123 can control operation of each component.

In a general situation (the normal process), an input of the detection unit 122 is disconnected from the signal simulation unit 125, so that the control unit 123 directly performs signal processing on a measurement value of the detection unit 122, to determine the change in the capacitance value at each sensing point. In the correction process, the detection unit 122 is electrically connected to the signal simulation unit 125. The control unit 123 enables the signal simulation unit 125 to simulate a touch event to generate a touch simulation signal. The touch simulation signal and a base signal obtained by the detection unit 122 from the signal sensor 14 are integrated into a touch signal (a sensing signal obtained when a target touch event occurs) obtained when each sensing point is simulated to be touched. In this embodiment, the touch simulation signal is equivalent to occurrence of a touch event. In an example, the touch event may be a normal touch event. For example, the touch event may be a finger touch event, and the touch simulation signal may be simulating signal strength of a finger signal. In an example, the touch event may be an abnormal touch event such as a water touch event or another conductive-foreign-material touch event. When the touch event is a water touch event, the touch simulation signal may be simulating signal strength of a water signal. When the touch event is an abnormal touch event (touch for a conductive foreign matter), the touch simulation signal simulates signal strength of a touch signal triggered by the conductive foreign matter.

A measurement threshold correction process of the capacitive sensing apparatus is further described in detail below.

Figure 3:
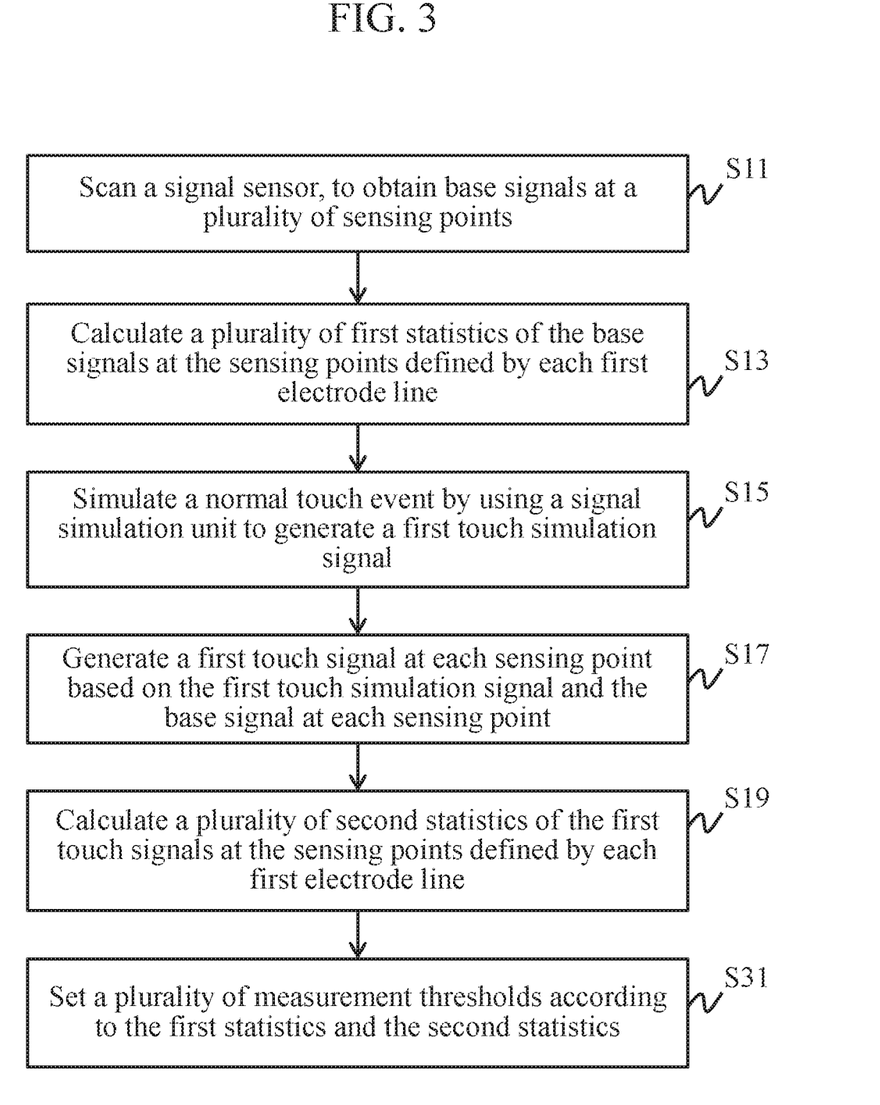
FIG. 3 is a schematic flowchart of a method for correcting a measurement threshold of a capacitive sensing apparatus according to an embodiment of the present invention.

Referring to FIG. 1 to FIG. 3, FIG. 3 is a schematic flowchart of a method for correcting a measurement threshold of a capacitive sensing apparatus according to an embodiment of the present invention.

When it is determined that no touch occurs on the signal sensor 14, the driving/detection unit scans the signal sensor 14, to obtain base signals at the sensing points P(1,1) to P(n,m) (step S11). In an example in which the first electrode lines Y1 to Ym may be sensing electrode lines and the second electrode lines X1 to Xn may be driving electrode lines, during each time of scanning, the driving unit 121 sequentially drives the driving electrode lines (the second electrode lines X1 to Xn). In addition, when any driving electrode line Xi (one of the second electrode lines X1 to Xn) is driven, the detection unit 122 measures the sensing electrode lines (the first electrode lines Y1 to Ym), to obtain base signals at sensing points P(i,1) to P(i,m) defined by the driving electrode line Xi and the sensing electrode lines (the first electrode lines Y1 to Ym). Then, a next driving electrode line X(i+1) is driven, and the sensing electrode lines (the first electrode lines Y1 to Ym) are measured. By analog, until the base signals at all the sensing points P(1,1) to P(n,m) are obtained, where i is any one of 1 to n. In an embodiment, the driving/detection unit may perform scanning in this manner. In another embodiment, the driving/detection unit may also repeatedly perform scanning for a plurality of times in this manner, to obtain a plurality of base signals at each sensing point.

After step S11, the control unit 123 calculates a plurality of statistics (referred to as first statistics hereinafter) of the first base signals at n sensing points defined by each first electrode line (step S13). Herein, the first statistics includes an average value of the base signals at the n sensing points defined by each first electrode line, a standard deviation of the base signals at the n sensing points defined by each first electrode line, a maximum value of the base signals at the n sensing points defined by each first electrode line, and a minimum value of the base signals at the n sensing points defined by each first electrode line. In some embodiments, the maximum value and the minimum value of the base signals at the n sensing points defined by each first electrode line can be integrated, so as to be represented by a maximum difference of the base signals at the n sensing points defined by each first electrode line. For example, for the first electrode line Y1, the control unit 123 calculates an average value, a standard deviation, a maximum value, and a minimum value of base signals at sensing points P(1,1) to P(n,1). For the first electrode line Y2, the control unit 123 calculates an average value, a standard deviation, a maximum value, and a minimum value of base signals at sensing points P(1,2) to P(n,2). By analog, until calculation is performed for the first electrode line Ym.

After step S11, the control unit 123 can control the signal simulation unit 125 to simulate a normal touch event to generate a touch simulation signal (referred to as a first touch simulation signal hereinafter) (step S15). Herein, the control unit 123 can generate a touch signal (referred to as a first touch signal hereinafter) at each sensing point based on the first touch simulation signal and the base signal at each sensing point (step S17).

After step S17, the control unit 123 calculates a plurality of second statistics of the first touch signals at the n sensing points defined by each first electrode line (step S19). The second statistics includes an average value of the first touch signals at the n sensing points defined by each first electrode line, a standard deviation of the first touch signals at the n sensing points defined by each first electrode line, a maximum value of the first touch signals at the n sensing points defined by each first electrode line, and a minimum value of the first touch signals at the n sensing points defined by each first electrode line. In some embodiments, the maximum value and the minimum value of the first touch signals at the n sensing points defined by each first electrode line can be integrated, so as to be represented by a maximum difference of the first touch signals at the n sensing points defined by each first electrode line. For example, for the first electrode line Y1, the control unit 123 calculates an average value, a standard deviation, a maximum value, and a minimum value of first touch signals at sensing points P(1,1) to P(n,1). For the first electrode line Y2, the control unit 123 calculates an average value, a standard deviation, a maximum value, and a minimum value of first touch signals at sensing points P(1,2) to P(n,2). By analog, until calculation is performed for the first electrode line Ym.

Figure 4:
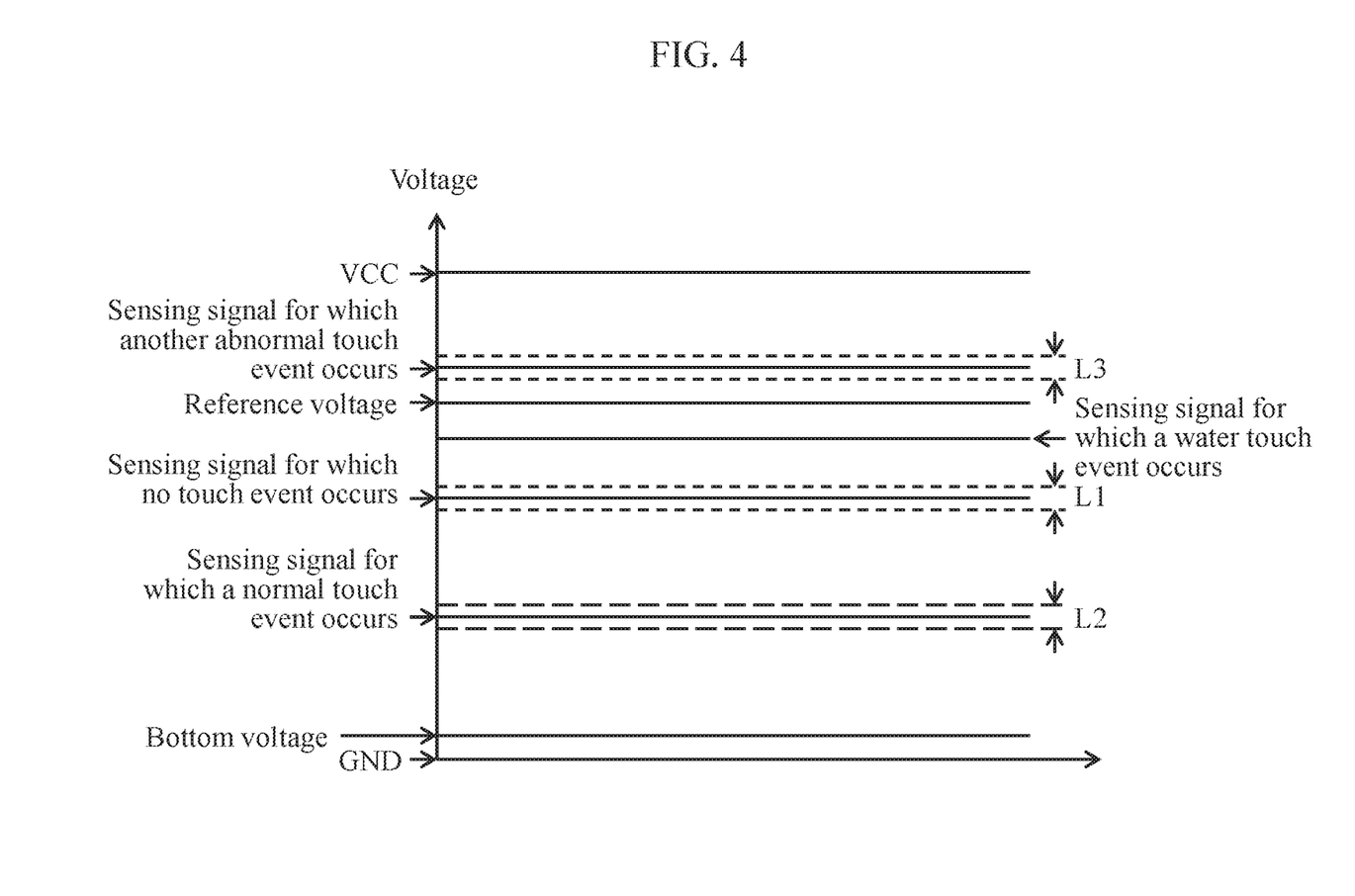
FIG. 4 is a schematic diagram of examples of some signals for a measurement threshold according to any embodiment of the present invention.

After the first statistics and the second statistics are obtained (step S13 and step S19), the control unit 123 sets a plurality of measurement thresholds according to the first statistics and the second statistics (step S31). The measurement thresholds includes an allowable (acceptable) range (referred to as a first allowable range L1 hereinafter) of a sensing signal for which no touch event (no touch) occurs, an allowable (acceptable) range (referred to as a second allowable range L2 hereinafter) of a sensing signal for which the normal touch event occurs, and a measurement reference point (base), as shown in FIG. 4. Herein, the measurement reference point includes a reference voltage (reference line) and a bottom voltage (bottom line), as shown in FIG. 4.

Figure 5:
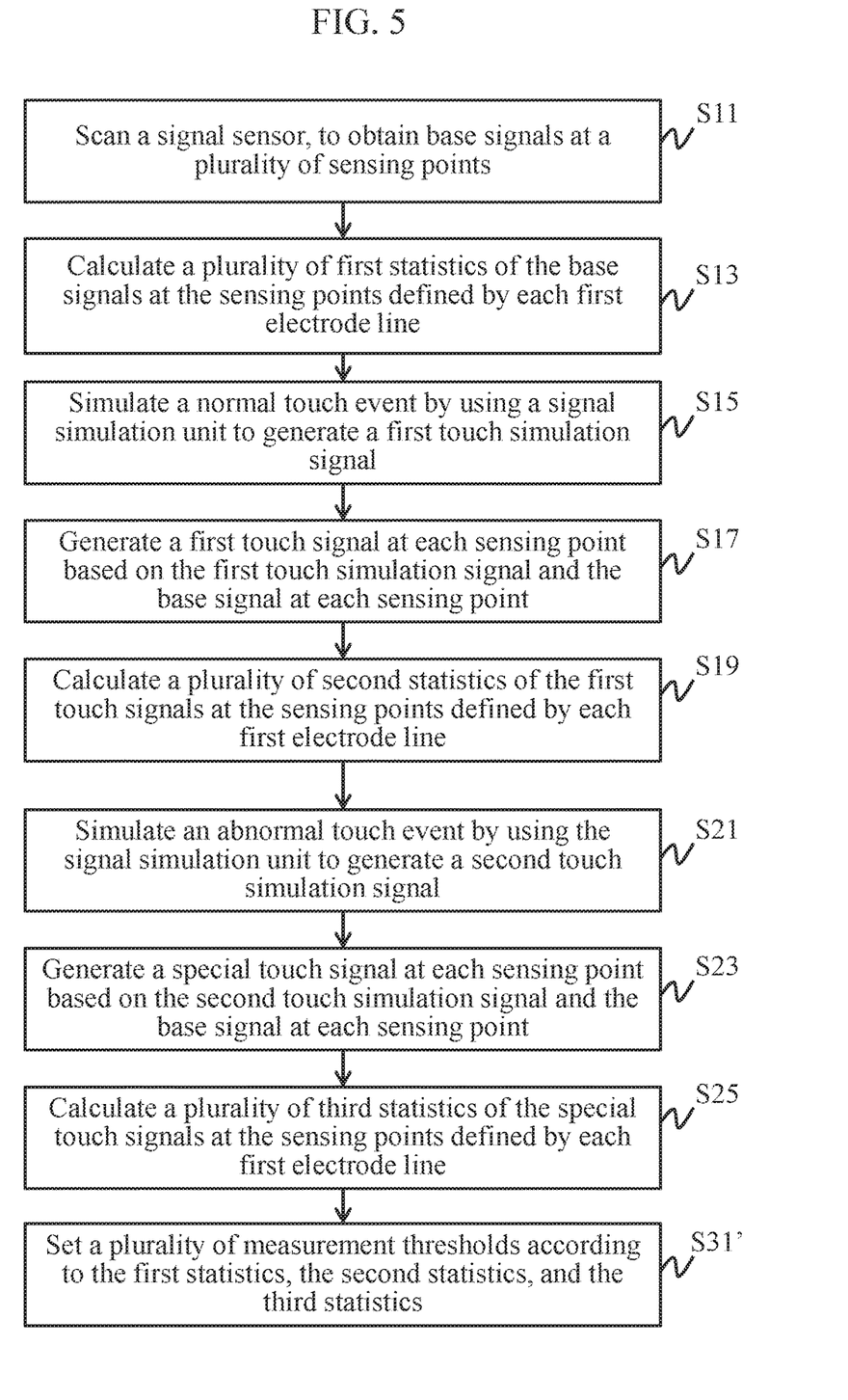
FIG. 5 is a schematic flowchart of a method for correcting a measurement threshold of a capacitive sensing apparatus according to another embodiment of the present invention.

In some embodiments, referring to FIG. 1, FIG. 2, and FIG. 5, after step S19, the control unit 123 further controls the signal simulation unit 125 to simulate an abnormal touch event to generate a touch simulation signal (referred to as a second touch simulation signal hereinafter) (step S21). Herein, the control unit 123 can generate a touch signal (referred to as a special touch signal hereinafter) at each sensing point based on the second touch simulation signal and the base signal at each sensing point (step S23).

After step S23, the control unit 123 calculates a plurality of third statistics of the special touch signals at the n sensing points defined by each first electrode line (step S25). The third statistics includes an average value of the special touch signals at the n sensing points defined by each first electrode line, a standard deviation of the special touch signals at the n sensing points defined by each first electrode line, a maximum value of the special touch signals at the n sensing points defined by each first electrode line, and a minimum value of the special touch signals at the n sensing points defined by each first electrode line. In some embodiments, the maximum value and the minimum value of the special touch signals at the n sensing points defined by each first electrode line can be integrated, so as to be represented by a maximum difference of the special touch signals at the n sensing points defined by each first electrode line. For example, for the first electrode line Y1, the control unit 123 calculates an average value, a standard deviation, a maximum value, and a minimum value of special touch signals at sensing points P(1,1) to P(n,1). For the first electrode line Y2, the control unit 123 calculates an average value, a standard deviation, a maximum value, and a minimum value of special touch signals at sensing points P(1,2) to P(n,2). By analog, until calculation is performed for the first electrode line Ym.

After the first statistics, the second statistics, and the third statistics are obtained (step S13, step S19, and step S25), the control unit 123 sets a plurality of measurement thresholds according to the first statistics, the second statistics, and the third statistics (step S31'). The measurement thresholds includes a first allowable range L1, a second allowable range L2, a measurement reference point, and a protection range L3 of a sensing signal for which the abnormal (such as water or another conductive foreign matter) touch event occurs, as shown in FIG. 4. Herein, the measurement reference point includes a reference voltage (reference line) and a bottom voltage (bottom line), as shown in FIG. 4.

In some embodiments, the control unit 123 may obtain, according to the obtained first statistics, the first allowable range L1 of the sensing signal for which no touch event (no touch) occurs.

In some embodiments, the control unit 123 may obtain, according to the obtained second statistics, the second allowable range L2 of the sensing signal for which the normal touch event (touch) occurs.

In an embodiment, when the abnormal touch event simulated by the signal simulation unit 125 is a water touch event, the control unit 123 may obtain, according to the third statistics of the special touch signals at the n sensing points defined by each first electrode line, a protection range of a sensing signal for which the water touch event occurs. In another embodiment, when the abnormal touch event simulated by the signal simulation unit 125 is an abnormal touch event, the control unit 123 may obtain, according to the third statistics of the special touch signals at the n sensing points defined by each first electrode line, a protection range L3 of a sensing signal for which the abnormal touch event occurs.

In some embodiments, the control unit 123 may obtain the measurement reference point according to the first statistics, the second statistics, and the third statistics.

In an example, the reference voltage (reference line) may be greater than an upper limit of the first allowable range L1 of the sensing signal for which no touch event (no touch) occurs. Preferably, the reference voltage (reference line) may be less than a lower limit of the protection range L3 of the sensing signal for which the abnormal touch event occurs.

In an example, the bottom voltage (bottom line) may be less than a lower limit of the second allowable range L2 of the sensing signal for which the normal touch event (touch) occurs.

In some embodiments, after the measurement reference point is obtained, the control unit 123 may first amplify a signal between the reference voltage (reference line) and the bottom voltage (bottom line) by a predetermined value (for example, 1.5, 2 or higher) in a subsequent signal processing process, so as to increase the identification rate of a signal processing unit.

In some embodiments, the signal simulation unit 125 can be implemented by a software or hardware circuit.

In an example, the signal simulation unit 125 may be an impedance switch circuit simulating the signal sensor 14, and may simulate, by conducting or turning off (across) a series resistor in the impedance switch circuit, that a touch occurs or no touch occurs.

Figure 6:
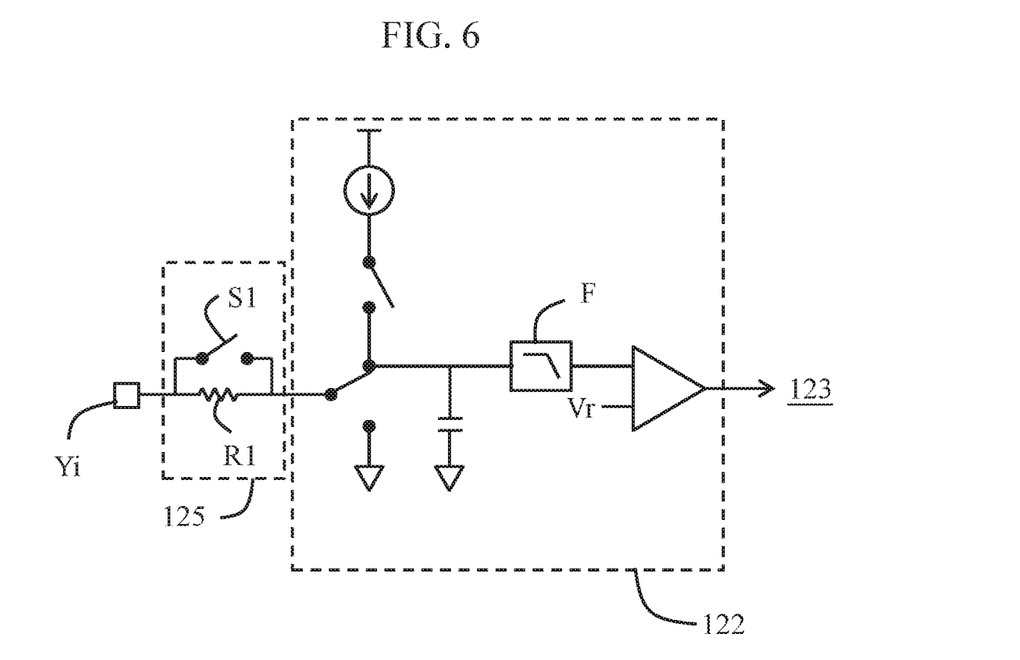
FIG. 6 is a schematic diagram of an example of a signal simulation unit in FIG. 1.

For example, a sensing point P(j,i) defined by a driving electrode line Xj and a sensing electrode line Yi is used as an example. Referring to FIG. 6, the signal simulation unit 125 may include one or more combination circuits and each combination circuit includes a switch S1 and a resistor R1. Herein, that the detection unit 122 is a capacitance switch circuit is used as an example. The input of the detection unit 122 is coupled to the sensing electrode line Yi via the resistor R1, and the switch S1 is coupled to both ends of the corresponding resistor R1. The driving electrode line Xj may be any one of the first electrode lines X1 to Xn, that is, j may be any one of 1 to n. The sensing electrode line Yi may be any one of the second electrode lines Y1 to Ym, that is, i may be any one of 1 to m.

In the normal process, the switch S1 is electrically connected to both ends of the resistor R1. The detection unit 122 directly measures, based on the measurement thresholds, a sensing capacitance of the sensing electrode line Yi for the driving electrode line Xj, and outputs a measurement value to the control unit 123. In the correction process, the switch S1 is turned off, so that the resistor R1 is electrically connected to the input of the detection unit 122. In this case, for a measurement value (a base signal), that is of a sensing capacitance of the sensing electrode line Yi for the driving electrode line Xj and that is measured by the detection unit 122 based on the measurement threshold, a corresponding pressure drop (a touch simulation signal) is generated via the resistor R1, to form a touch signal, and then the touch signal is output to the control unit 123.

In some embodiments, when the signal simulation unit 125 has a plurality of combination circuits each having a switch S1 and a resistor R1, the number of resistors R1 connected to the detection unit 122 depends on on/off of the switches S1 in the combination circuits, to provide touch simulation signal with corresponding different capacitance values. That is, different resistance values represent signal responses for touches caused by different touch elements (for example, a finger, water, or a conductive foreign matter). In some embodiments, when the signal simulation unit 125 has single combination circuit with a single switch S1 and a single resistor R1, the resistor R1 may be a variable resistor. The control unit 123 may adjust a resistance value of the variable resistor, so that the resistor R1 provides signal responses for touches caused by different touch elements (for example, a finger, water, or a conductive foreign matter).

In another example, the signal simulation unit 125 may be a capacitance switch circuit simulating the signal sensor 14, and may simulate, by conducting or turning off a parallel capacitance in the capacitance switch circuit, that a touch occurs or no touch occurs.

Figure 7:
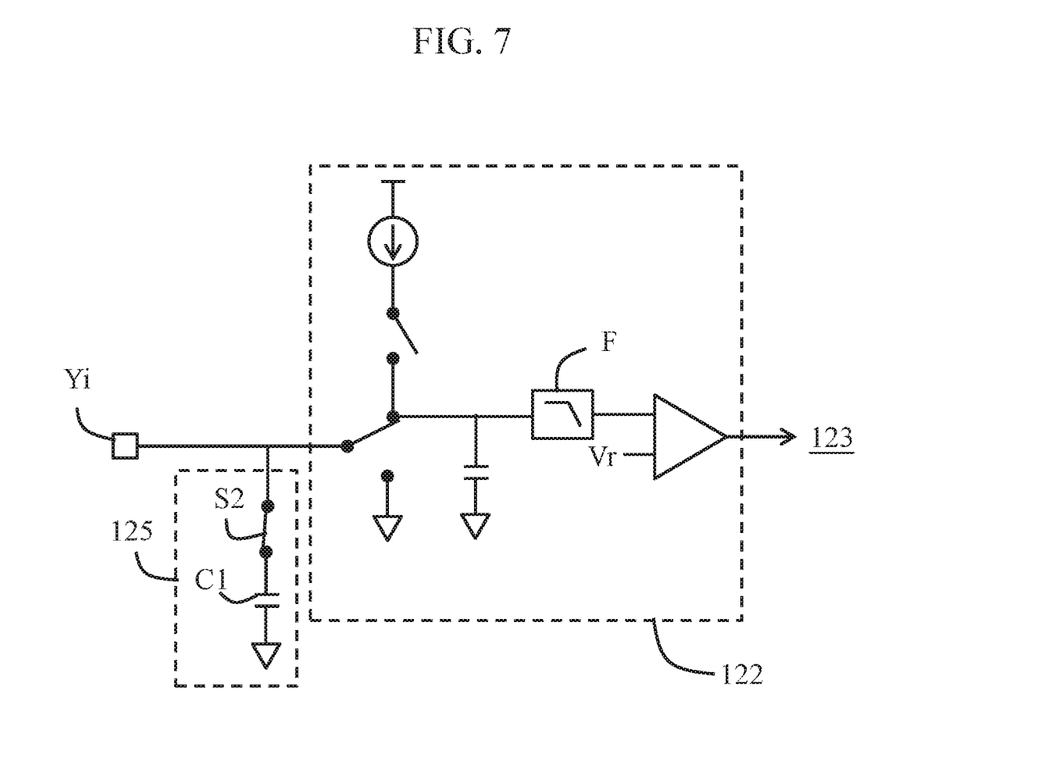
FIG. 7 is a schematic diagram of another example of a signal simulation unit in FIG. 1.

For example, a sensing point P(j,i) defined by a driving electrode line Xj and a sensing electrode line Yi is used as an example. Referring to FIG. 7, the signal simulation unit 125 may include one or more combination circuits and each combination circuit includes a switch S2 and a capacitor C1. Herein, that the detection unit 122 is a capacitance switch circuit is used as an example. The input of the detection unit 122 is coupled to the sensing electrode line Yi, and the capacitor C1 is coupled to the input of the detection unit 122 via the corresponding switch S2. In other words, when the switch S2 is on, a sensing capacitance of the capacitor C1 for the driving electrode line Xj is in parallel with that of the sensing electrode line Yi for the driving electrode line Xj.

In the normal process, the switch S2 is turned off, and the detection unit 122 directly measures, based on the measurement thresholds, a capacitance value (a sensing signal) of a sensing capacitance of the sensing electrode line Yi for the driving electrode line Xj, and outputs the capacitance value to the control unit 123. In the correction process, the switch S2 is on, so that a sensing capacitance of the capacitor C1 for the driving electrode line Xj is in parallel with that of the sensing electrode line Yi for the driving electrode line Xj. After measuring, based on the measurement thresholds, a sum (a touch signal) of a capacitance value (a base signal) of the sensing capacitance of the sensing electrode line Yi for the driving electrode line Xj and a capacitance value (a touch simulation signal) of the capacitor C1, the detection unit 122 outputs the sum to the control unit 123.

In some embodiments, when the signal simulation unit 125 has a plurality of combination circuits each having a switch S2 and a capacitor C1, each capacitor C1 may provide touch sensing signals for touches caused by different touch elements (for example, a finger, water, or a conductive foreign matter). In some embodiments, when the signal simulation unit 125 has a combination of a single switch S2 and a single capacitor C1, the capacitor C1 may be a variable capacitor. The control unit 123 may adjust a capacitance value of the variable capacitor, so that the capacitor C1 provides signal responses for touches caused by different touch elements (for example, a finger, water, or a conductive foreign matter).

Figure 8:
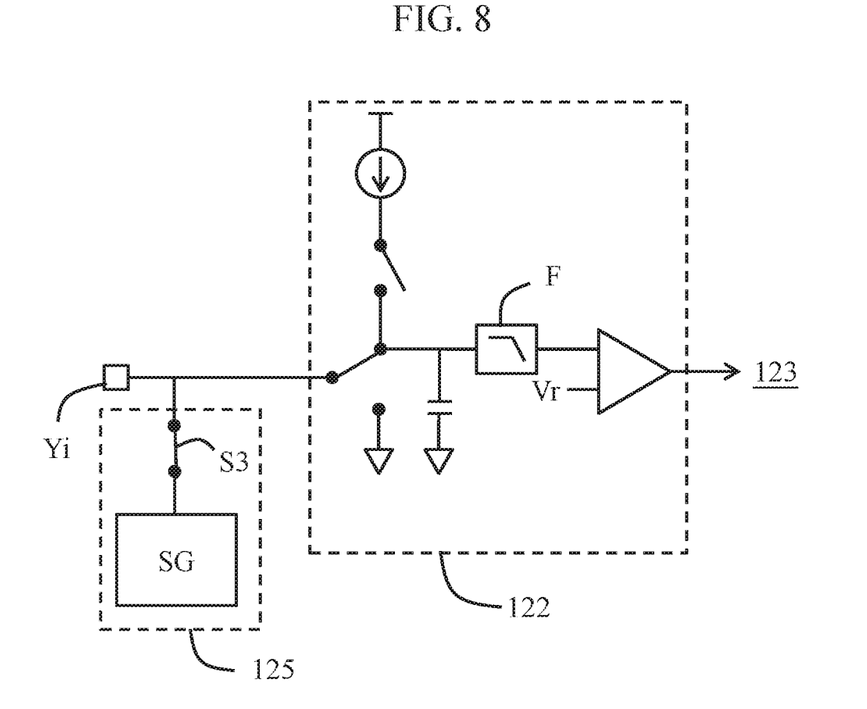
FIG. 8 is a schematic diagram of still another example of a signal simulation unit in FIG. 1.

In still another example, referring to FIG. 8, the signal simulation unit 125 may be a signal generator SG, and the signal generator SG is coupled to the input of the detection unit 122 via a switch S3.

In the normal process, the switch S3 is turned off. In the correction process, the switch S3 is on, and the signal generator SG may generate a required touch simulation signal (such as simulating the normal touch event or simulating the abnormal touch event) in a software form. After measuring, based on the measurement thresholds of the sensing points, a sum (a touch sensing signal) of a capacitance value (a base signal) of a sensing capacitance of the sensing electrode line Yi for the driving electrode line Xj and the touch simulation signal, the detection unit 122 outputs the sum to the control unit 123.

In some embodiments, the signal simulation unit 125 is built in a chip of the capacitive sensing apparatus and is isolated from an external environment of the capacitive sensing apparatus. In other words, with respect to the signal sensor 14, the signal simulation unit 125 is packaged inside, and a finger cannot come into contact with or in close to (to an extent to affect an electrical property of the signal simulation unit 125) the signal simulation unit 125. Therefore, the signal simulation unit 125 is not easily affected by external noise. The chip in which the signal simulation unit 125 is built may be an independent chip that does not implement other elements (the control unit, the driving/detection unit, and a path selection unit), or may be a multifunctional chip that can implement both the signal simulation unit 125 and other elements (the control unit, the driving/detection unit, a path selection unit, or any combination thereof). In other words, the signal processing circuit 12 may be implemented by one or more chips.

In some embodiments, setting of the measurement threshold can be implemented by setting parameters such as a comparison base Vr of a comparator, a filtering range of a filter F, and/or a parameter for the control unit 123 to perform signal processing.

In some embodiments, after an initial correction process of setting the measurement thresholds (step S31 or S31'), the signal processing circuit 12 may regularly perform a periodical correction process, to determine whether a change occurs, thereby avoiding a change in the measurement reference point over time.

Figure 9:
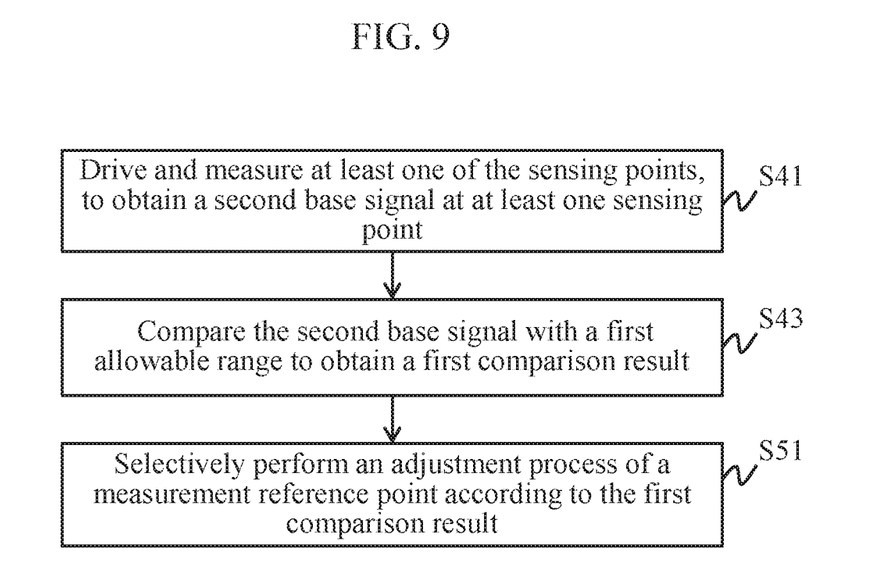
FIG. 9 is a schematic flowchart of an example of a periodical correction process in a method for correcting a measurement threshold of a capacitive sensing apparatus according to the present invention.

Referring to FIG. 1, FIG. 2, and FIG. 9, the control unit 123 controls the driving/detection unit to drive and measure at least one of the sensing points P(1,1) to P(n,m) (taking k sensing points as an example), to obtain second base signals at the k sensing points (step S41), where k is a positive integer greater than or equal to 1 and less than n*. Herein, the control unit 123 may randomly read a sensing signal (the second base signal) for which no touch event (no touch) occurs at one or more sensing points. In an example, the control unit 123 may obtain a second base signal at a sensing point at any position on a panel. In another example, the control unit 123 may obtain second base signals at any two sensing points at different positions on a panel. In still another example, the control unit 123 may obtain second base signals at any ten sensing points at different positions on a panel. In step S41, the number of sensing points is not limited in the present invention, and the number of sensing points at which second base signals are obtained may be set according to an actual requirement (for example, an operation speed or precision).

After the second base signals are obtained (step S41), the control unit 123 separately compares the second base signal on each sensing points with the first allowable range to obtain a first comparison result (step S43). In addition, the control unit 123 selectively performs an adjustment process of the measurement reference point according to the first comparison result (step S51). For example, when a second base signal at any sensing point exceeds the first allowable range (higher than an upper limit or lower than a lower limit), the control unit 123 determines that a change occurs and performs the adjustment process of the measurement reference point. On the contrary, when no second base signal at any sensing point exceeds the first allowable range (between the upper limit and the lower limit), the control unit 123 determines that no change occurs and does not perform the adjustment process of the measurement reference point. In another example, when the number of sensing points at which a second base signal exceeds the first allowable range is greater than a predetermined number (for example, a positive integer less than k such as one, two, three), the control unit 123 determines that a change occurs and performs the adjustment process of the measurement reference point. On the contrary, when the number of sensing points at which a second base signal exceeds the first allowable range is less than or equal to the predetermined number, the control unit 123 determines that no change occurs and does not perform the adjustment process of the measurement reference point.

In some embodiments, the control unit 123 may further determine, according to a sensing signal on which a normal touch event (touch) occurs, whether a change occurs.

Figure 10:
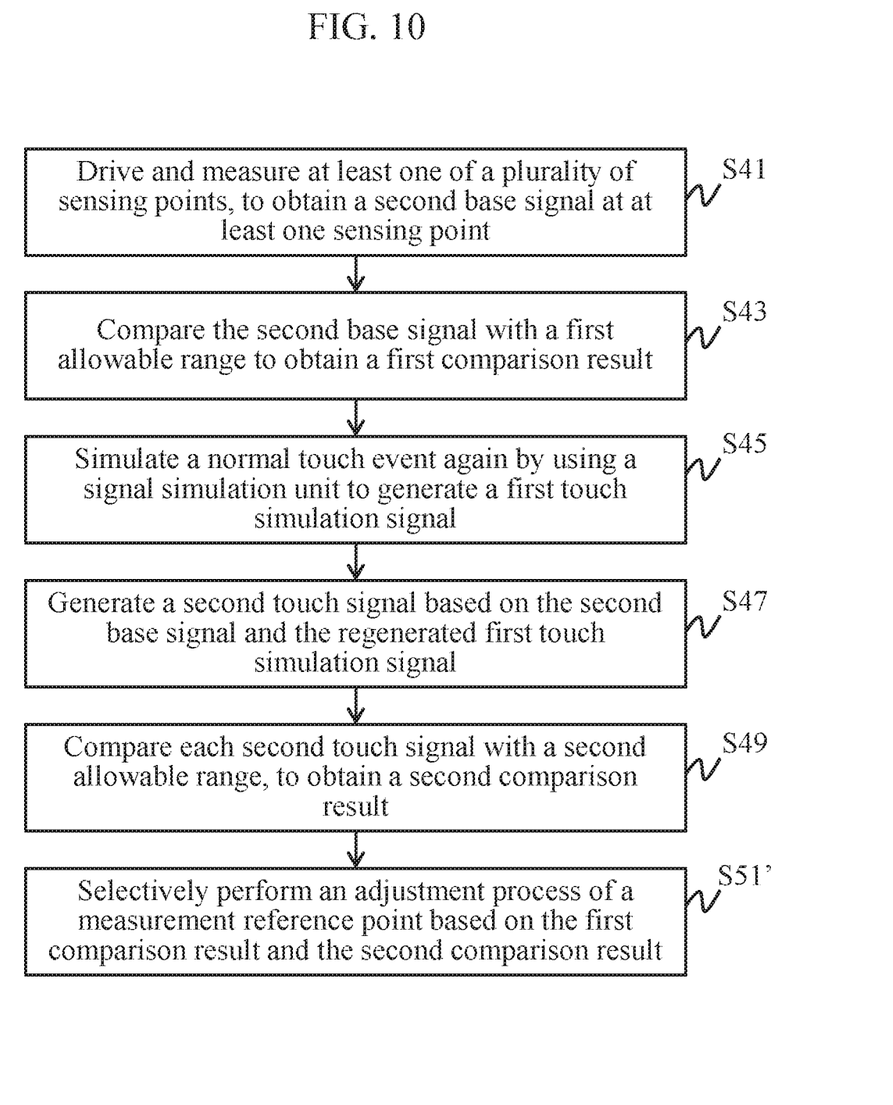
FIG. 10 is a schematic flowchart of another example of a periodical correction process in a method for correcting a measurement threshold of a capacitive sensing apparatus according to the present invention.

Referring to FIG. 1, FIG. 2, and FIG. 10, after the second base signals are obtained (step S41), the control unit 123 enables the signal simulation unit 125, so that the signal simulation unit 125 simulates the normal touch event again to generate a first touch simulation signal (step S45). The control unit 123 generates a touch signal (referred to as a second touch signal hereinafter) based on the second base signal and the regenerated first touch simulation signal (step S47). In other words, the control unit 123 may randomly read a sensing signal (a second touch signal) at one or more sensing points at which the normal touch event (touch) occurs, to obtain second touch signals at g sensing points, where g is a positive integer greater than or equal to 1 and less than n*, and g may be equal to or may be not equal to k. Herein, the number (g) of sensing points is not limited in the present invention, and the number of sensing points at which second touch signals are obtained may be set according to an actual requirement (for example, an operation speed or precision). Herein, a source of the second touch signals obtained by the control unit 123 and a source of the obtained second base signals may be a same sensing point or may be different sensing points (the numbers may be the same or different), or some of sources may be a same sensing point and the other sources may be different sensing points (the numbers may be the same or different).

After the second touch signals are obtained (step S47), the control unit 123 compares each second touch signal with the second allowable range, to obtain a second comparison result (step S49), and selectively performs an adjustment process of the measurement reference point according to the first comparison result and the second comparison result (step S51'). For example, when a second base signal at any sensing point exceeds the first allowable range (higher than an upper limit or lower than a lower limit) or a second touch signal at any sensing point exceeds the second allowable range (higher than an upper limit or lower than a lower limit), the control unit 123 determines that a change occurs and performs the adjustment process of the measurement reference point. On the contrary, when no second base signal at any sensing point exceeds the first allowable range (between the upper limit and the lower limit) or no second touch signal at any sensing point exceeds the second allowable range (between the upper limit and the lower limit), the control unit 123 determines that no change occurs and does not perform the adjustment process of the measurement reference point. In another embodiment, the control unit 123 may determine whether a sum of the number of sensing points at which the second base signal exceeds the first allowable range and the number of sensing points at which the second touch signal exceeds the second allowable range is greater than a predetermined number, and when the sum is greater than the predetermined number, determine that a change occurs; or on the contrary, when the sum is not greater than the predetermined number, determine that no change occurs.

In some embodiments, referring to FIG. 1, the signal processing circuit 12 may further include a storage unit 127, and the control unit 123 is coupled to the storage unit 127.

Figure 11:
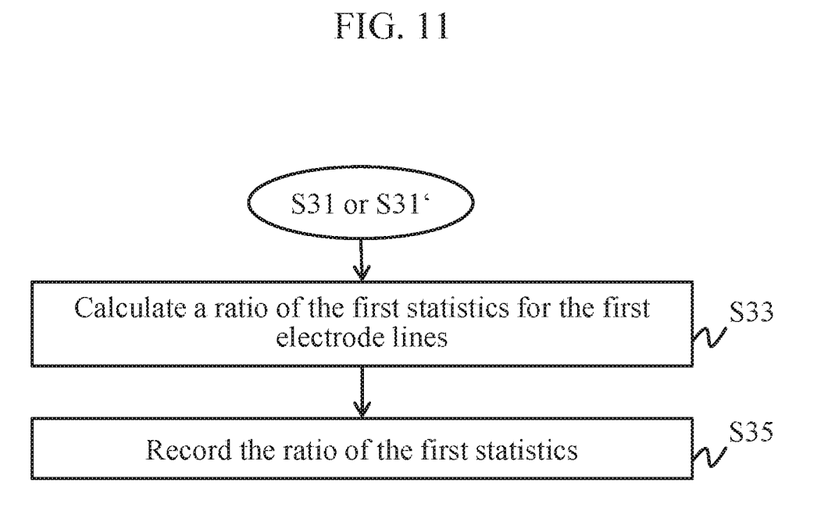
FIG. 11 is a partially schematic flowchart of a method for correcting a measurement threshold of a capacitive sensing apparatus according to some other embodiments of the present invention.

In some embodiments, referring to FIG. 1, FIG. 2, and FIG. 11, in the initial correction process of setting the measurement thresholds (step S31 or S31'), the control unit 123 further calculates a ratio of first statistics for each of the first electrode lines Y1 to Ym (step S33), and records the calculated ratio of the first statistics in the storage unit 127 as a standard ratio (step S35). For example, the control unit 123 calculates at least one of a ratio of the average values for the first electrode lines Y1 to Ym, a ratio of the standard deviations for the first electrode lines Y1 to Ym, a ratio of the maximum values for the first electrode lines Y1 to Ym, and a ratio of the minimum values for the first electrode lines Y1 to Ym.

Figure 12:
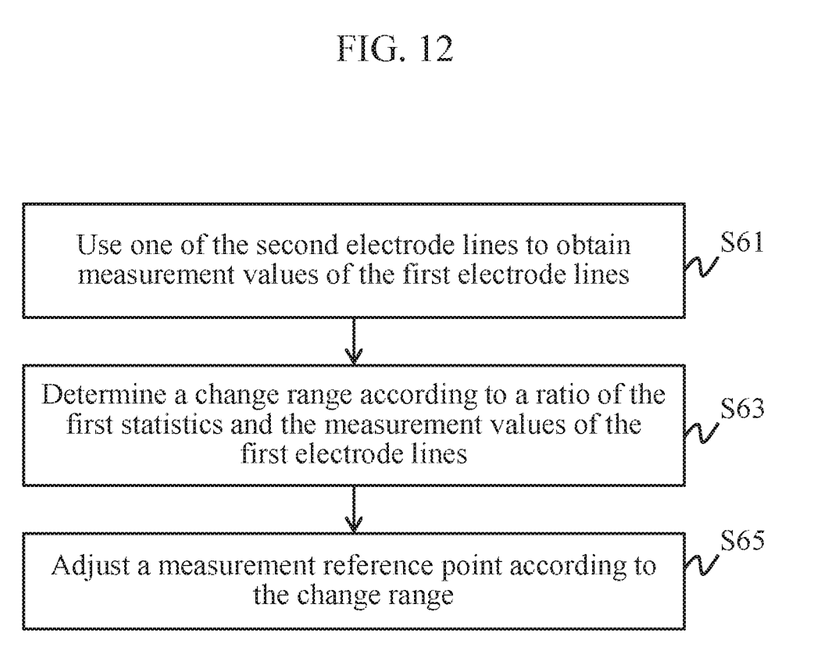
FIG. 12 is a flowchart of an example of an adjustment process of a measurement reference point in FIG. 9 or FIG. 10.

In some embodiments, referring to FIG. 1, FIG. 2, and FIG. 12, when the adjustment process of the measurement reference point is performed, the control unit 123 uses one of the second electrode lines X1 to Xn to obtain measurement values of the first electrode lines Y1 to Ym (step S61). For example, that the first electrode lines Y1 to Ym may be sensing electrode lines, and the second electrode lines X1 to Xn may be driving electrode lines. The control unit 123 controls the driving unit 121 to drive the second electrode line X1, and controls the detection unit 122 to measure, based on the measurement thresholds, sensing capacitances of the first electrode lines Y1 to Ym for the driving electrode line X1, to obtain measurement values for the first electrode lines Y1 to Ym.

Then, the control unit 123 determines a change range (a voltage range of a change value) according to the obtained measurement values for the first electrode lines Y1 to Ym and the standard ratio (step S63), and adjusts the measurement reference point according to the change range ((step S65). In some embodiments, after obtaining the voltage range of the change value, the control unit 123 may set the voltage range as a protection range, so as not to read a signal in this range. In an example, the control unit 123 may adjust the measurement reference point to about the change value, for example, adjust the reference voltage to about the change value or to lower than the change value.

It should be understood that, an execution order of the steps is not limited to the foregoing order, and may be properly adjusted according to execution content of the steps.

In some embodiments, the storage unit 127 is configured to store related software/firmware programs, information, data, and a combination thereof. Herein, the storage unit 127 may be implemented by one or more memories.

In conclusion, according to the method for correcting a measurement threshold of a capacitive sensing apparatus and the capacitive sensing apparatus in the present invention, a measurement threshold used when the capacitive sensing apparatus performs touch detection can be set by using statistics of various signals at all sensing points on a same electrode, thereby avoiding problems such as non-uniform strength and insufficient strength of a signal at each sensing point caused by a measurement time difference. Herein, all measurement thresholds are obtained with respect to grounding GND, a driving voltage VCC, and a neighboring signal. That is, one sensing point has three references (statistics) and has a differential effect, thereby filtering out noise with respect to grounding GND, the driving voltage VCC, and common-mode signal, and then improving precision.

What is claimed is:

1. A method for correcting a measurement threshold of a capacitive sensing apparatus, comprising:

scanning a signal sensor, to obtain base signals at a plurality of sensing points on the signal sensor, wherein the signal sensor comprises a plurality of first electrode lines and a plurality of second electrode lines, and the plurality of first electrode lines and the plurality of second electrode lines are arranged in a staggered manner to define the plurality of sensing points;

simulating a normal touch event by using a signal simulation unit, to generate a first touch simulation signal;

generating a first touch signal at each of the plurality of sensing point based on the first touch simulation signal and a base signal at each of the plurality of sensing point;

calculating a plurality of first statistics of the base signals at a plurality of sensing points defined by each of the plurality of first electrode line of the plurality of sensing points, wherein the plurality of first statistics comprises an average value of the plurality of base signals, a standard deviation of the plurality of base signals, a maximum value of the plurality of base signals, and a minimum value of the plurality of base signals;

calculating a plurality of second statistics of the first touch signals at the plurality of sensing points defined by each the first electrode line, wherein the plurality of second statistics comprises an average value of the plurality of first touch signals, a standard deviation of the plurality of first touch signals, a maximum value of the plurality of first touch signals, and a minimum value of the plurality of first touch signals; and setting a plurality of measurement thresholds according to the plurality of first statistics and the plurality of second statistics, wherein the plurality of measurement thresholds comprises a first allowable range of a sensing signal for which no touch event occurs, a second allowable range of a sensing signal for which the normal touch event occurs, and a measurement reference point.

2. The method for correcting a measurement threshold of a capacitive sensing apparatus according to claim 1, further comprising:

simulating an abnormal touch event by using the signal simulation unit, to generate a second touch simulation signal;

generating a special touch signal at each sensing point based on the second touch simulation signal and the base signal at each sensing point;

calculating a plurality of third statistics of the special touch signals at the plurality of sensing points defined by each first electrode line, wherein the plurality of third statistics comprises an average value of the plurality of special touch signals, a standard deviation of the special touch signals, a maximum value of the plurality of special touch signals, and a minimum value of the plurality of special touch signals, wherein the step of setting a plurality of measurement thresholds according to the plurality of first statistics and the plurality of second statistics comprises: setting the plurality of measurement thresholds according to the plurality of first statistics, the plurality of second statistics, and the plurality of third statistics.

3. The method for correcting a measurement threshold of a capacitive sensing apparatus according to claim 2, wherein the plurality of measurement thresholds further comprises a protection range of the sensing signal for which the abnormal touch event occurs.

4. The method for correcting a measurement threshold of a capacitive sensing apparatus according to claim 1, further comprising:

driving and measuring at least one of the plurality of sensing points, to obtain a second base signal at the at least one sensing point;

comparing each second base signal with the first allowable range, to obtain a first comparison result; and selectively performing an adjustment process of the measurement reference point according to the first comparison result.

5. The method for correcting a measurement threshold of a capacitive sensing apparatus according to claim 4, further comprising:

simulating the normal touch event again by using the signal simulation unit, to generate the first touch simulation signal;

generating a second touch signal based on each second base signal and the regenerated first touch simulation signal; and comparing each second touch signal with the second allowable range, to obtain a second comparison result, wherein the step of selectively performing an adjustment process of the measurement reference point according to the first comparison result is: selectively performing the adjustment process of the measurement reference point according to the first comparison result and the second comparison result.

6. The method for correcting a measurement threshold of a capacitive sensing apparatus according to claim 1, further comprising:

calculating a ratio of the first statistics for the plurality of first electrode lines; and recording the ratio of the first statistics.

7. The method for correcting a measurement threshold of a capacitive sensing apparatus according to claim 6, further comprising:

obtaining a measurement value for the plurality of first electrode lines by using one of the plurality of second electrode lines;

determining a change range according to the ratio of the first statistics and a plurality of measurement values for the plurality of first electrode lines; and adjusting the measurement reference point according to the change range.

8. The method for correcting a measurement threshold of a capacitive sensing apparatus according to claim 7, wherein the plurality of first electrode lines is sensing electrode lines, and the plurality of second electrode lines is driving electrode lines.

9. The method for correcting a measurement threshold of a capacitive sensing apparatus according to claim 7, wherein the plurality of first electrode lines is driving electrode lines, and the plurality of second electrode lines is sensing electrode lines.

10. A capacitive sensing apparatus, comprising:

a plurality of first electrode lines;

a plurality of second electrode lines, wherein the plurality of first electrode lines and the plurality of second electrode lines are staggered with each other, and the plurality of first electrode lines and the plurality of second electrode lines define a plurality of sensing points configured in a matrix; and a signal processing circuit, electrically connected to the plurality of first electrode lines and the plurality of second electrode lines, wherein the signal processing circuit performs a correction process and performs touch detection on each sensing point based on a result of the correction process, and the signal processing circuit is configured to execute the correction process to:

scan the plurality of sensing points, to obtain base signals of the plurality of sensing points;

simulate a normal touch event to generate a first touch simulation signal;

generate a first touch signal at each sensing point based on the first touch simulation signal and a base signal at each sensing point;

calculate a plurality of first statistics of the base signals at the plurality of sensing points defined by each first electrode line, wherein the plurality of first statistics comprises an average value of the plurality of base signals, a standard deviation of the plurality of base signals, a maximum value of the plurality of base signals, and a minimum value of the plurality of base signals;

calculate a plurality of second statistics of the first touch signals at a plurality of sensing points defined by each first electrode line of the plurality of sensing points, wherein the plurality of second statistics comprises an average value of the plurality of first touch signals, a standard deviation of the first touch signals, a maximum value of the plurality of first touch signals, and a minimum value of the plurality of first touch signals; and set plurality of measurement thresholds according to the plurality of first statistics and the plurality of second statistics, wherein the plurality of measurement thresholds comprises a first allowable range of a sensing signal for which no touch event occurs, a second allowable range of a sensing signal for which the normal touch event occurs, and a measurement reference point.

* * * * *